(12) United States Patent
Sandlin et al.

(10) Patent No.: US 10,981,355 B2
(45) Date of Patent: *Apr. 20, 2021

(54) KINETICALLY LIMITED NANO-SCALE DIFFUSION BOND STRUCTURES AND METHODS

(71) Applicants: Medtronic, Inc., Minneapolis, MN (US); Corning Incorporated, Corning, NY (US)

(72) Inventors: Michael S. Sandlin, Chandler, AZ (US); David A. Ruben, Mesa, AZ (US); Raymond M. Karam, Santa Barbara, CA (US); Georges Roussos, San Jose, CA (US); Thomas M. Wynne, Santa Barbara, CA (US)

(73) Assignees: Medtronic, Inc, Minneapolis, MN (US); Corning Incorporated, Corning, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/156,760

(22) Filed: Oct. 10, 2018

(65) Prior Publication Data

US 2019/0039347 A1 Feb. 7, 2019

Related U.S. Application Data

(63) Continuation of application No. 14/976,475, filed on Dec. 21, 2015, now Pat. No. 10,124,559.

(Continued)

(51) Int. Cl.
*B32B 7/04* (2019.01)
*B23K 20/02* (2006.01)
(Continued)

(52) U.S. Cl.
CPC ............... *B32B 7/04* (2013.01); *B23K 20/02* (2013.01); *B23K 20/22* (2013.01); *B32B 15/04* (2013.01);
(Continued)

(58) Field of Classification Search
CPC ......... B32B 7/04; B32B 15/04; B32B 17/061; B32B 37/14; B32B 2311/18; B23K 20/02;
(Continued)

(56) References Cited

U.S. PATENT DOCUMENTS 4,810,318 A  3/1989 Haisma et al.
5,054,683 A  10/1991 Haisma et al.
(Continued)

FOREIGN PATENT DOCUMENTS

CN   1986137    6/2007
CN   104125870  10/2014
(Continued)

OTHER PUBLICATIONS

Application and File History for U.S. Appl. No. 14/976,475, filed Dec. 21, 2015, inventors Sandlin et al.
(Continued)

*Primary Examiner* — William K Cheung
(74) *Attorney, Agent, or Firm* — Patterson Thuente Pedersen, P.A.

(57) ABSTRACT

Bulk materials having a kinetically limited nano-scale diffusion bond is provided. The bulk materials having a kinetically limited nano-scale diffusion bond includes transparent material, absorbent opaque material and a diffusion bond. The transparent material has properties that allow an electromagnetic beam of a select wavelength to pass there through without more than minimal energy absorption. The absorbent opaque material has properties that significantly (Continued)

absorb energy from the electromagnetic beam. The diffusion bond is formed by the electromagnetic beam bonding the transparent material to the absorbent opaque material. Moreover, the diffusion bond has a thickness that is less than 1000 nm.

30 Claims, 13 Drawing Sheets

Related U.S. Application Data

(60) Provisional application No. 62/096,706, filed on Dec. 24, 2014.

(51) Int. Cl.
| | | |
|---|---|---|
| B32B 15/04 | (2006.01) | |
| B23K 20/22 | (2006.01) | |
| B32B 37/14 | (2006.01) | |
| B32B 17/06 | (2006.01) | |
| B23K 103/14 | (2006.01) | |
| B23K 103/18 | (2006.01) | |
| B23K 103/00 | (2006.01) | |
| B23K 103/16 | (2006.01) | |

(52) U.S. Cl.
CPC ........... *B32B 17/061* (2013.01); *B32B 37/14* (2013.01); *B23K 2103/14* (2018.08); *B23K 2103/172* (2018.08); *B23K 2103/18* (2018.08); *B23K 2103/52* (2018.08); *B23K 2103/54* (2018.08); *B32B 2311/18* (2013.01)

(58) Field of Classification Search
CPC ............... B23K 20/22; B23K 2103/18; B23K 2103/52; B23K 2103/14; B23K 2103/172; B23K 2103/54
USPC ...................................................... 428/411.1
See application file for complete search history.

(56) References Cited

U.S. PATENT DOCUMENTS

| | | | |
|---|---|---|---|
| 5,489,321 | A | 2/1996 | Tracy et al. |
| 5,647,932 | A | 7/1997 | Taguchi et al. |
| 5,693,111 | A | 12/1997 | Kadowaki et al. |
| 5,813,592 | A | 9/1998 | Midling et al. |
| 6,477,901 | B1 | 11/2002 | Tadigadapa et al. |
| 6,503,847 | B2 | 1/2003 | Chen et al. |
| 6,555,025 | B1 | 4/2003 | Krupetsky et al. |
| 6,762,072 | B2 | 7/2004 | Lutz |
| 6,822,326 | B2 | 11/2004 | Enquist et al. |
| 6,998,776 | B2 | 2/2006 | Aitken et al. |
| 7,078,726 | B2 | 7/2006 | Pichler et al. |
| 7,344,901 | B2 | 3/2008 | Howtof et al. |
| 7,417,307 | B2 | 8/2008 | Haluzak et al. |
| 7,540,934 | B2 | 6/2009 | Hofmann et al. |
| 8,125,146 | B2 | 2/2012 | Park |
| 8,304,324 | B2 | 11/2012 | Huff |
| 8,323,333 | B2 | 12/2012 | Furst et al. |
| 8,448,468 | B2 | 5/2013 | Pastel et al. |
| 8,660,157 | B2 | 2/2014 | Huff et al. |
| 9,171,721 | B2 | 10/2015 | Danzl et al. |
| 2002/0115920 | A1 | 8/2002 | Rich et al. |
| 2004/0012083 | A1 | 1/2004 | Farrell et al. |
| 2004/0082145 | A1 | 4/2004 | Reichenbach et al. |
| 2005/0151151 | A1 | 7/2005 | Hawtof et al. |
| 2005/0284815 | A1 | 12/2005 | Sparks et al. |
| 2006/0267167 | A1 | 11/2006 | McCain |
| 2007/0170839 | A1 | 7/2007 | Choi et al. |
| 2007/0238263 | A1 | 10/2007 | Yilmaz et al. |
| 2008/0102096 | A1 | 5/2008 | Molin et al. |
| 2010/0262208 | A1 | 10/2010 | Parker |
| 2010/0263794 | A1 | 10/2010 | George et al. |
| 2010/0304151 | A1 | 12/2010 | Tuennermann et al. |
| 2012/0100318 | A1 | 4/2012 | Danzl et al. |
| 2012/0101540 | A1 | 4/2012 | O'Brien et al. |
| 2012/0161305 | A1 | 6/2012 | Ruben et al. |
| 2013/0112650 | A1* | 5/2013 | Karam ................ B29C 65/7841 216/13 |
| 2016/0185081 | A1 | 6/2016 | Sandlin et al. |
| 2016/0213812 | A1 | 7/2016 | Pathak et al. |

FOREIGN PATENT DOCUMENTS

| | | |
|---|---|---|
| DE | 102007008540 A1 | 8/2008 |
| EP | 0 232 935 A1 | 8/1987 |
| EP | 1 864 784 A1 | 12/2007 |
| EP | 1 117 502 B2 | 7/2008 |
| JP | 59-101296 | 6/1984 |
| JP | 2000271769 | 10/2000 |
| JP | 2000271769 A | 10/2000 |
| JP | 2000-343264 | 12/2000 |
| JP | 2003-136600 | 5/2003 |
| JP | 2003225946 | 8/2003 |
| JP | 2003225946 A | 8/2003 |
| JP | 2009-173023 | 8/2009 |
| JP | 2011-038201 | 2/2011 |
| JP | 2011056519 | 3/2011 |
| JP | 2011056519 A | 3/2011 |
| WO | WO 03/032377 A1 | 4/2003 |
| WO | WO 2008/044349 A1 | 4/2008 |
| WO | WO 2010/117382 A1 | 10/2010 |

OTHER PUBLICATIONS

Brown, Josh, "Precision Laser Welding of Clear Thermoplastics Without Additives", Medical Design Technology [online] Aug. 5, 2013 [retrieved on Aug. 2, 2016] Retrieved from the internet: http://www.mdtmag.com/articles/2013/08/precision-laser-welding-clear-thermoplastics-without-additives. 4 pages.

Brown, Matthew S. et al. "Chapter 4—Fundamentals of Laser-Material Interaction and Application to Multiscale Surface Modification." in: Multiscale Laser Surface Modification (Springer-Verlag, Berlin, 2010), pp. 91-120.

Gillner, A. et al. Laser Bonding of Micro Optical Components. Proceedings of SPIE. vol. 4941 (Oct. 2003) pp. 112-120.

Park, Jong-Seung. Characterization of Transmission Laser Bonding (TLB) Technique for Microsystem Packaging, Arizona State University (May 2006) 135 pages.

Sands, David. Pulsed Laser Heating and Melting, Heat Transfer—Engineering Applications, Prof. Vyacheslav Vikhrenko (Ed.), InTech [online] 2011. Retrieved from: <http://www.intechopen.com/books/heat-transfer-engineering-applications/pulsed-laser-heating-and-melting> pp. 47-70.

Sari, F. et al. Applications of laser transmission processes for the joining of plastics, silicon and glass micro parts. Microsyst Technol 14 [online] Jul. 18, 2008, pp. 1879-1886.

Theppakuttai, S. et al. Localized Laser Transmission Bonding for Microsystem Fabrication and Packaging. Journal of Manufacturing Processes, vol. 6, No. 1 (2004) 8 pages.

Wiemer, Maik et al. Developments trends in the field of wafer bonding. 214 ECS Meeting, Abstract #2229, © The Electrochemical Society [Online] Oct. 12-17, 2008 Honolulu, Hawaii [retrieved online on Aug. 2, 2016] retrieved at: <http://ma.ecsdl.org/content/MA2008-02/33/2229.full.pdf+html> 1 page.

Wild, M. J. et al. Locally selective bonding of silicon and glass with laser. Sensors and Actuators A, vol. 93, Issue 1 (Aug. 25, 2001) pp. 63-69.

Witte, Reiner et al. Laser Joining of Glass with Silicon. Proceedings of SPIE, vol. 4637 (Jan. 21, 2002) pp. 487-495.

International Search Report for corresponding Application No. PCT/US2015/067390, dated Apr. 28, 2016, 6 pages.

Invenios, Invenios Announces New Substrates for Micro-system Production Process for the Permanent Bonding of Silicon, Metal, and Glass, (Feb. 27, 2014) [online], [retrieved on Jun. 21, 2016]. Retrieved from the internet: <http://invenios.com/company/newsevents/new-substrates-for-micro-system-production-process/>.

(56) References Cited

OTHER PUBLICATIONS

Quintino, L. et al. Bonding NiTi to glass with femtosecond laser pulses. Materials Letters, vol. 98 (2013) pp. 142-145.
Schmidt, Martin A. Wafer-to-Wafer Bonding for Microstructure Formation, Proceedings of the IEEE, vol. 86, No. 8 (Aug. 1998), pp. 1575-1585.
Utsumi, Akihiro et al. Direct Bonding of Glass and Metal Using Short Pulsed Laser, Journal of Laser Micro/Nanengineering, vol. 2, No. 2 (Apr. 2007) pp. 133-136.
European Communication pursuant to Article 94(3) EPC for EP Application No. 15828908.2 dated Apr. 5, 2019.
Chinese Notice of the First Office Action for Chinese Application No. 2015800711553.7 dated Apr. 18, 2019.
Japanese Reason for Rejection for JP Application No. 2017-533968 dated Nov. 13, 2019.
Chinese Notice of the Second Office Action for Chinese Application No. 201580071155.7 dated Dec. 4, 2019.
European Communication pursuant to Article 94(3) EPC for EP Application No. 15828908.2 dated May 29, 2020.
Japanese Notice of Allowance for JP Application No. 2017-533968 dated Aug. 17, 2020.
Global Dossier Translation of JP2017533968 Office Action dated Aug. 17, 2020; 2 pages; Japanese Patent Office.
Coucoulas, A., "Compliant Bonding" Proceedings 1970 IEEE 20th Electronic Components Conference, pp. 380-389, (1970).
Halbig et al., "Diffusion Bonding of Silicon Carbide for MEMS-LDI Applications", National Aeronautics and Space Administration (NASA). 31$^{st}$ International Conference & Exposition on Advanced Ceramics and Composites. Daytona Beach, Florida. Jan. 21-26, 2007.
ScienceDirect, "Biostability" from Encyclopedia of Toxicology (Third Edition), 2014. As accessed on Nov. 13, 2020. https://sciencedirect.com/topics/materials-science/biostability.

\* cited by examiner

KINETICALLY LIMITED NANO-SCALE DIFFUSION BOND STRUCTURES AND METHODS

CROSS REFERENCE TO RELATED APPLICATIONS

This application is a continuation of U.S. application Ser. No. 14/976,475 filed Dec. 21, 2015, now issued as U.S. Pat. No. 10,124,559, which claims benefit of U.S. Provisional Application Ser. No. 62/096,706 filed Dec. 24, 2014, which is incorporated in its entirety by reference herein.

BACKGROUND

Bonding different types of bulk material together to form a bonded article has many applications in a variety of industries. For example, in the semiconductor industry the ability to bond an insulator material to a conductive material is highly desired. Moreover, being able to attach an insulative material, such as sapphire, to a metal, like titanium, has many applications including the formation of packaging for photonic and medical devices. Another example industry that desires the ability to effectively attach sapphire to titanium is the manufacturing of high end jewelry. This method also has applicability for bonding sapphire windows in high vacuum systems, and military and space vehicles.

Traditional methods of bonding these types of material together use high temperature and high pressure to create a diffusion bond that is typically in the tens to hundreds of microns thickness range. The temperatures used can be in the order of 600-1000° C. These high temperatures can result in harm to the products they are forming. For example, when forming packages for devices, high temperatures used to form the bonds in the package risk damaging components that are within the package. This also results in grain growth in polycrystalline materials and alters their physical properties. Moreover, undesirable compounds form in bond regions with the use of high temperatures over long formation times that can affect the strength or toughness of the bond. Additionally, differences in the thermal expansion coefficients of the materials bonded using diffusion bonding techniques can lead to the generation of interfacial stresses as the assembly cools from high temperatures. These stresses often result in crack generation. The size of the cracks that are created due to interfacial stresses tends to scale with the size of the interaction zone of the materials being joined. Since typical diffusion bonding creates relatively large interaction zones, the cracks that are generated also tend to extend several microns to millimeters. Brittle materials will spontaneously fail catastrophically even under small loads if the cracks exceed the critical flaw size. So larger cracks will likely result in reduced reliability and service life. For this reason, traditional diffusion bonding techniques have had limited success in creating mechanically robust bonds between materials with dissimilar thermal expansion coefficients. Other known methods for bonding titanium and sapphire include metallizing the sapphire with a thin film of niobium and brazing the components together with gold or other suitable braze material. Typical temperatures are 450 to 1200 C.

A few relatively low temperature methods used to bond dissimilar materials with the hope of not harming the internal components of a package utilize an intermediate layer, such as with solder, glass frit, or thermocompression bonding. These processes use moderate temperatures, ranging from 100° to 400° C., and moderate pressures to achieve the bond joint. As an example, solders of tin-indium-silver, or tin-lead, tin-copper-silver can be used. However, this approach has several disadvantages. The flux used for soldering is prone to cause contamination which is difficult to detect especially if the bond is used to seal the enclosure. The strength of the bond is inferior to that of the bulk materials, and these solder alloys are susceptible to corrosion if exposed to harsh environments. Another example is a thermal compression bond effected with the use of nanoporous gold and the application of high pressure to the bulk materials. However, it is difficult with these techniques to determine the integrity of the bond and the bond strength is far inferior to the strength of the bulk materials. Other methods using adhesives are used to form bonds however, the bonds are inherently weaker and non-hermetic.

For the reasons stated above and for other reasons stated below which will become apparent to those skilled in the art upon reading and understanding the present specification, there is a need in the art for a method of creating a bond between insulator and conductive bulk materials that is formed at low temperature and has a strength as strong as the bulk materials.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment bulk materials having a kinetically limited nano-scale diffusion bond is provided. The bulk materials having a kinetically limited nano-scale diffusion bond includes transparent material, absorbent opaque material and a diffusion bond. The transparent material has properties that allow an electromagnetic beam of a select wavelength to pass there through without more than minimal energy absorption. The absorbent opaque material has properties that significantly absorb energy from the electromagnetic beam. The diffusion bond is formed by the electromagnetic beam bonding the transparent material to the absorbent opaque material. Moreover, the diffusion bond has a thickness that is less than 1000 nm.

In yet another embodiment, bulk materials having a kinetically limited nano-scale diffusion bond is provided. In this embodiment, the bulk materials having a kinetically limited nano-scale diffusion bond include transparent material, absorbent material, an interfacial bond joint, undisturbed transparent material and undisturbed absorbent opaque material. The transparent material has properties that allow an electromagnetic beam of a select wavelength to pass there through without more than minimal energy absorption. The absorbent material has properties that significantly absorb energy from the electromagnetic beam. The bond is formed by the electromagnetic beam bonding the transparent material to the absorbent material. The bond interfacial bond joint is less than 1000 nm in thickness. The undisturbed transparent material and undisturbed absorbent material are located outside the less than 1000 nm bond. Moreover, the undisturbed transparent material and undisturbed absorbent material are not affected by the formation of the bond.

In still another embodiment, a method of forming a kinetically limited nano-scale diffusion bond in bulk materials is provided. The method includes positioning a first surface to be bonded of a transparent material against a second surface to be bonded of an absorbent opaque material. The transparent material has properties that allow an electromagnetic beam of a select wavelength to pass there through without more than minimal energy absorption and the absorbent opaque material has properties that significantly absorb energy from the electromagnetic beam. Pressure on the transparent material and absorbent opaque material is then applied so that the first surface to be bonded of the transparent material is in contact with the second surface to be bonded of the absorbent opaque material. An electromagnetic beam is then selectively passed through the transparent material to the second surface to be bonded of the absorbent opaque material. The electromagnetic beam then creates a kinetically limited nano-scale diffusion bond between the transparent material and the absorbent opaque material.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
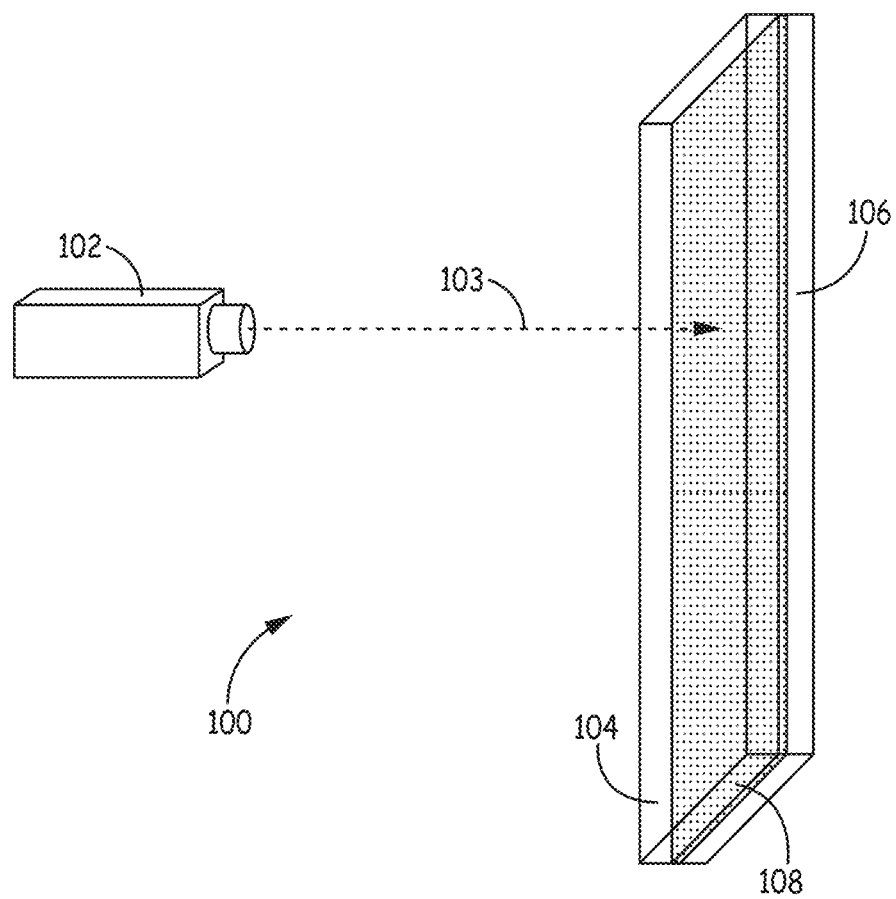
FIG. 1 is a pictorial illustration of the formation of a bond in one embodiment of the present invention.

Embodiments of the present invention provide for the bonding of dissimilar bulk materials with a rapid room-temperature process. The bulk materials being bonded include a transparent material 104 (non-metal ((insulator)) material) and an absorbent opaque material 106 (metal ((conductor)) material) as generally illustrated in FIG. 1. The transparent material 104 is at least partially transparent to a wavelength of electromagnetic beam 103 (electromagnetic radiation, electromagnetic signal or generally a laser signal) from a laser 102. Hence, the transparent material 104 has properties that allow the electromagnetic beam to pass there through without more than minimal energy absorption. In embodiments, a diffusion bond having a thickness of less than 1000 nm is created in bonding the dissimilar bulk material together.

The absorbent material 106 absorbs and interacts with the energy of the electromagnetic radiation 103 and a bond interface 108 is created between the bulk materials 104 and 106 by diffusion between the absorbent and transparent materials 106 and 104 (diffusion of the opaque material 106 into the transparent material 104 or the transparent material 104 into the opaque material 106). Further in some embodiments, diffusion includes interdiffusion where both materials diffuse into each other. Example transparent material 104 includes glass, polycrystalline or single crystal materials such as but not limited to sapphire and quartz. Other transparent material examples include, but are not limited to, zirconia, diamond, metal oxides and corundum variations. The absorbent material 106 includes metals such as, but not limited to, titanium. Moreover the absorbent material 106 could be an alloy of titanium. The minimal energy absorption through the transparent material 104 while interacting with the absorbent material 106 to form the desired bond will generally need to meet the following dual requirement: (1) The energy transmitted through the transparent material 104 must be sufficient to activate the bonding process at the interface via absorption by the opaque material 106, and simultaneously (2) any energy absorbed by the transparent material 104 must not be sufficient to melt, distort, or otherwise affect the bulk of the transparent material 104 away from the bond interface 108. Generally energy absorption curves for materials rise relatively fast as a function of wavelength. For process control and repeatability, a wavelength that is not on this high slope region of the absorption curve may be selected for the transparent material 104. Moreover, in one embodiment the minimal energy absorption by the transparent material 104 is less than 50% of the total energy of the electromagnetic radiation 103.

The bond created, as described in detail below, has an interface toughness (strength) that is similar (equivalent in some embodiments) to the strength of at least one of the bulk materials 104 and 106. Moreover in some embodiments the bond created does not contain cracks or imperfections large enough to reduce the measured fracture toughness of the joint to a level below that of the bulk fracture toughness of the transparent material involved in the joint. In some embodiments, the bond created is generally continuous, uniform and crack free. In addition, in an embodiment, the bond provides a hermetic seal that is corrosion resistant and bio-stable. Moreover, in embodiments, the bond interface 108 (mixing or diffusion zone) is a relatively thin interface (in the sub micron (i.e. nano-scale) range) due to a short heating time. With the use of select materials and the short local bonding time and absence of bulk heating, the formation of undesirable compounds at or near the interface that can weaken the bond, are minimized or eliminated. In the examples of the use of titanium as the absorbent material 106 and sapphire as the transparent material 104, a uniform interface region 108 is created. Although the thermal expansion coefficients of the titanium and sapphire are relatively close, techniques described herein may apply to coupling other dissimilar materials together that have vastly different thermal expansion coefficients such as gold and sapphire, or aluminum and sapphire.

Figures 2, 3:
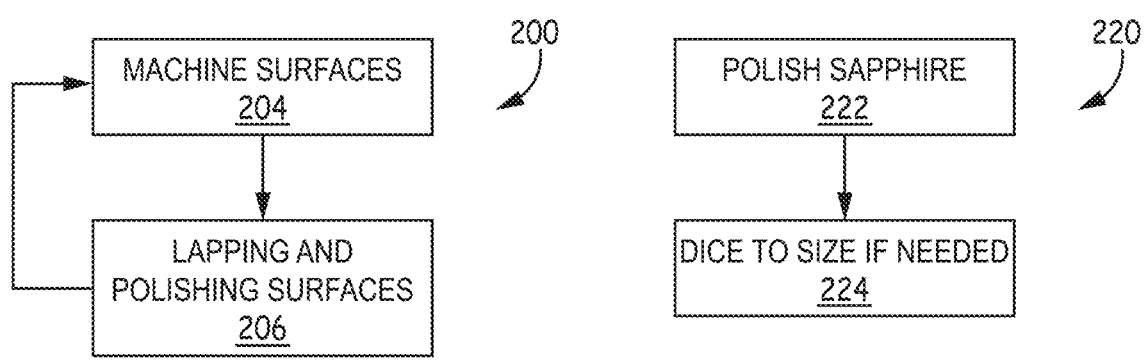
FIG. 2 is a titanium prep flow diagram of one embodiment of the present invention.
FIG. 3 is a sapphire prep flow diagram of one embodiment of the present invention.

In embodiments, the bulk materials are first processed to prepare them to be joined. The preparation of the bulk materials in the titanium-sapphire example is provided in the titanium prep flow diagram 200 of FIG. 2 and the sapphire prep diagram 220 of FIG. 3. Regarding titanium, in an embodiment, a grade of titanium is selected to be used. In an embodiment, the titanium is machined to form two flat parallel surfaces (204). One of the flat surfaces is used for bonding to the sapphire and the other is used to provide a relatively flat surface upon which a force can be applied. In another embodiment, only one surface of the titanium is machined flat. In an embodiment, a lapping process and polishing process is applied to the surface of the titanium to be bonded to the sapphire to improve surface quality (206). In one embodiment, the lapping includes the use of a combination of Blanchard grinding and a 12 μm diameter aluminum oxide ($Al_2O_3$) slurry (alumina). In one embodiment the order of machining surfaces (204) and lapping and polishing surfaces (206) is reversed. Moreover, in some embodiments, the machining surfaces (204) and lapping and polishing surfaces (206) are interwoven. Further in one embodiment, the bonding surface of the titanium is polished in a two step process to improve surface quality. The first polishing step uses a mixture of 1.5 um diamond slurry. The second and final polishing step uses a 0.5 μm diamond slurry. In some embodiments, a flatness in the sub-micron range is desirable to ensure intimate contact of the surfaces to be bonded when they are mated. Alternate slurries and methods may be employed to achieve the necessary flatness and surface finish. It was found that a smooth scratch free surface with a roughness (Ra) of less than 100 nm enables a desirable hermetic bond joint. However, a hermetic bond can be achieved with a roughness up to 200 nm or greater. Moreover, non-hermetic bonds can be achieved with a roughness of up to 500 nm or greater depending on the morphology. In an embodiment not requiring a hermetic seal be created with the bond, some of the fine polishing may be eliminated. Regarding preparing the sapphire, the sapphire is first polished (222). In an embodiment, a C or R plane crystal orientation is used. The sapphire is then diced to size if required (224).

Figure 4A:
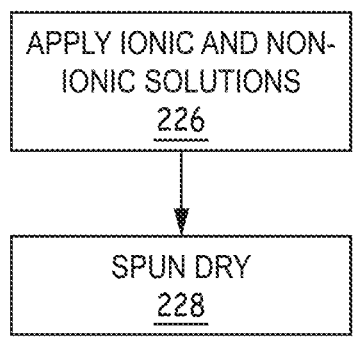
FIG. 4A is general cleaning flow diagram of one embodiment of the present invention.
Figure 4B:
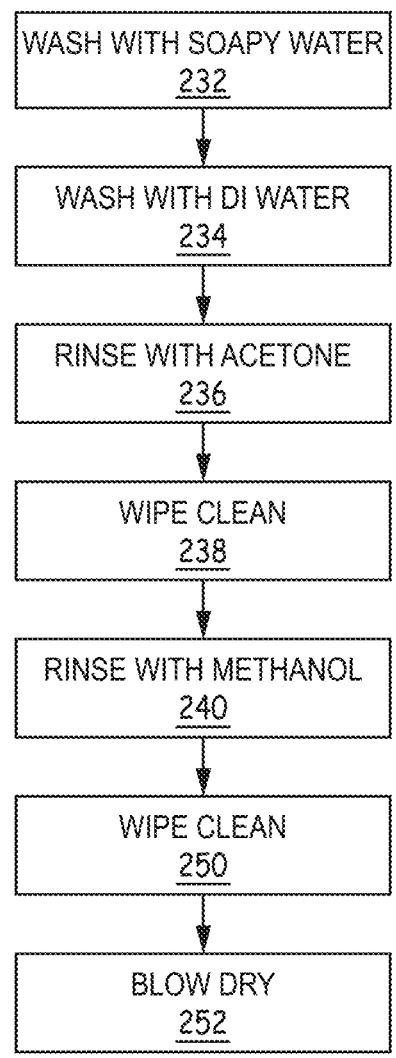
FIG. 4B is a titanium cleaning flow diagram of one embodiment of the present invention.

Once the titanium and sapphire are prepped they are both cleaned. In one example embodiment, the titanium and sapphire are generally cleaned with ionic and non-ionic solutions as required (226) and are then spun dry (228) as illustrated in the general cleaning flow diagram 225 of FIG. 4A. A further example of a specific cleaning for titanium is illustrated in the titanium cleaning flow diagram 230 of FIG. 4B. The titanium is washed with soapy water (232) and then with deionized water (234). The bulk titanium material 104 is then first rinsed with acetone (236) and then wiped clean (238) in an embodiment. The bulk titanium material 104 is then rinsed with methanol (240) and then wiped clean (250) in an embodiment. The titanium material is then blow dried with an air gun or the like (252). In one embodiment, a wafer fabrication process to clean and dry the titanium is used. After the titanium is cleaned in an embodiment, the wiping of the surfaces is avoided.

Figures 5, 6:
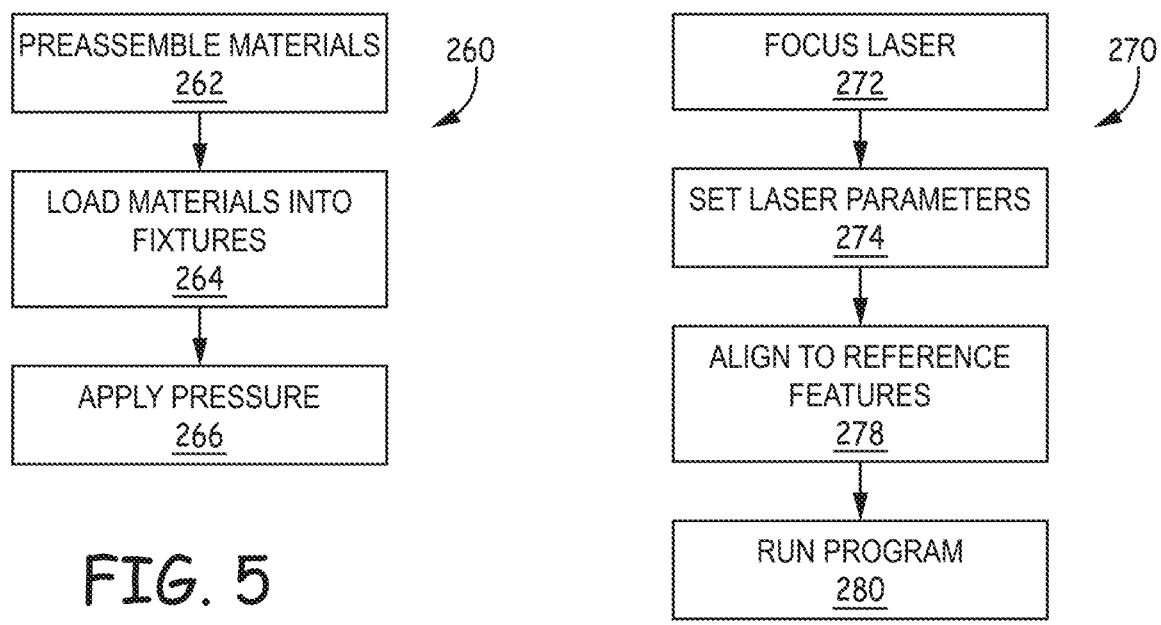
FIG. 5 is an initial set up flow diagram of one embodiment of the present invention.
FIG. 6 is a bonding flow diagram of one embodiment of the present invention.

After the bulk materials 104 and 106 are prepped and cleaned they are preassembled (262) as set out in the initial set up flow diagram 260 of FIG. 5. The bulk materials 104 and 106 are preassembled by placing the surface to be bonded of the titanium next to the surface of the sapphire. Once the titanium and sapphire are properly positioned in relation to each other they are loaded into a holding frame 550 of a bonding fixture assembly 308 (shown in FIG. 9 through FIG. 11 and described below) (264). The holding frame 550 holds the titanium and sapphire in place in relation to each other. A pressure is then applied to press the titanium against the sapphire (266). The amount of pressure needed to bond bulk materials with the processes described herewith is at least partially dependant on the materials being bonded as well as the shape and sizes of the bulk material. Generally, the pressure need only be high enough to ensure intimate contact of the bonding surfaces such that bonding occurs when irradiated by the laser. Moreover, in some embodiments, an amount of pressure at the interface that causes high point contact of the interface surfaces is generally enough to ensure bonding. Once the bulk materials are in the fixture and the pressure is applied, the bond between the materials is created. The process to form the bond in the materials is set out in the bonding flow diagram 270 of FIG. 6, at room temperature. As illustrated in FIG. 6, the laser 102 is directed through the transparent material 104 (the sapphire in this example) to the surface of the absorbent material 106 (the titanium in this example) as illustrated in FIG. 1. In an embodiment, the laser bonding parameters include pulse energy, pulse width, pulse frequency, spot size, and spot overlap or pitch. In forming bonds, the values of the parameters are generally dependent on each other. Hence, selecting a value of one parameter will result in a select value for another parameter to form a desired kinetically limited bond. All that is needed to form a bond is the delivery of energy in a way that bonds the structures together as desired. Accordingly, the invention is not limited to specific parameters. Spot size and spot overlap are discussed below in view of FIG. 7.

Figure 7:
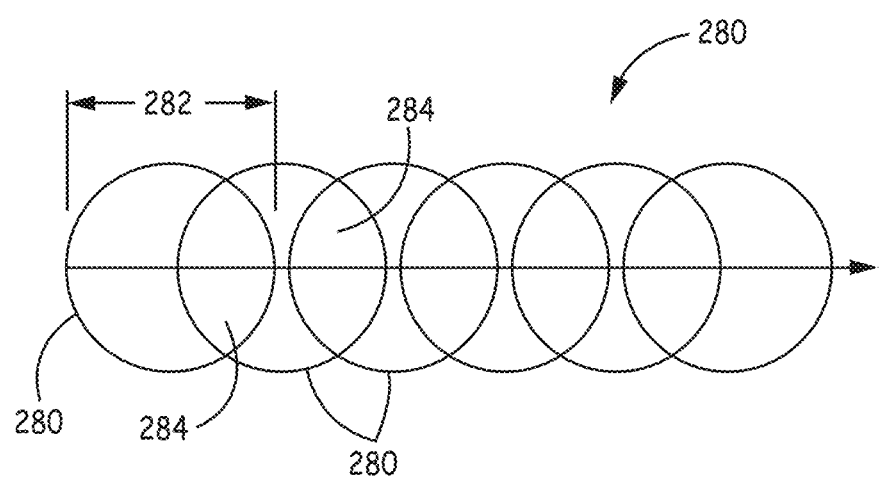
FIG. 7 is a laser pulse spot size-overlap illustration of one embodiment of the present invention.

Spot size is the width/diameter 282 of a laser beam on a surface 280 (electromagnetic beam). FIG. 7 illustrates pulses 282 (electromagnetic pulses or laser pulses) over time as the electromagnetic beam is moved relative to its target. In the example shown in FIG. 7, the focused laser pulse 280 is generally circular. The spot overlap 284 is a percentage of a pulse 280 that overlaps a previous pulse 280. In the titanium-sapphire example, the spot size 282 of the laser pulse 280 may be in the 5-15 μm range. Good results were achieved with an overlap in the range of 0-50% in the titanium-sapphire example. Higher overlap is also acceptable but comes at the expense of process time. Similar results may be obtained with higher energy per pulse and less overlap, or less energy per pulse and more overlap. In the titanium-sapphire bulk materials example, frequencies in the range of 1-80 kHz, pulse energies of 1-5 μJ with the electromagnetic beam being moved relative to the titanium-sapphire bulk materials at a rate of 5 mm/s-600 mm/s were explored. It was determined through experimentation that a laser with a UV 355 nm-IR 1064 wavelength, an average power of 2.1 mW-100 mW, a repetition rate (frequency of pulses) of about 1 kHz and the laser signal being moved relative to the titanium-sapphire bulk materials at a rate of 5 mm/s to 600 mm/s created a uniform, strong and continuous bond. The average power being equal to a pulse energy of about 0.6 to 2.1 µJ times the 1 kHz repetition rate (average power=pulse energy x repetition rate). The repetition rate and the average laser power are set to create the desired pulse energy and pulse overlap for the bonding routine. In the titanium-sapphire example, an overlap of 1-10% is preferable. Power levels are dependent on spot size which is around 10 microns in an embodiment, and one may expect similar results with parameters that achieve an equivalent fluence. It was also determined through experimentation that increasing the pulse energies to 2.5 µJ and beyond, while keeping the other parameters as set out above, a bond is created but cracking starts to appear and with pulse energies much less than 2.0 µJ a bond will not form. In addition, at a frequency of 12 kHz and a pulse energy of 1 µJ, with the other parameters being the same as stated above, a desired bond was formed. Hence, higher frequencies with lower energy could be used. In addition, lower frequencies with higher overlap could be used to achieve an equivalent energy deposit to form a bond. Moreover, the use of other wavelengths is contemplated, including wavelengths across the entire UV, visible and infrared spectra. For example, a laser with a wavelength of 532 nm could be used. In this example, a preferred set of laser processing parameters include, a pulse energy of 1 uJ, a spot size of 10 µm, a pulse frequency of 1 kHz, and a pulse overlap of 50%. Quenching bands may be formed when bonding bulk materials together as a result of how fast the bonding material is cooled during the bonding process. The quenching bands define characteristics of the bonding structure. How fast the material is cooled is at least part of a function of the pulse width and power. Hence, changing the pulse shape can change the bonding structure. As discussed above, the parameters given above are example parameters. Depending on the materials being bonded and the bond desired other parameters can be used. For example a pulsed or continuous wave can be used to form a bond. Moreover, overlap ranges from 0 to 100% could be used to form a desired bond between materials. Hence the present invention is not limited to specific parameters such as specific frequencies, spot sizes, overlaps or wavelengths.

Once the operating parameters are set, the laser is aligned with reference features (278). A program is then run by a controller 302 to activate the laser and move a stage 307 of the bonding fixture assembly 308 to form the bond as further discussed below in regards to FIG. 8 (280). In an alternative embodiment, a scanner 305 is used to move laser 102 instead of a stage 307 being used to move the bulk material. Moreover, a combination of stage and beam movements may also be employed. In the titanium-sapphire example, it was determined that the bulk materials (the titanium and sapphire) or laser shall translate at a speed necessary to achieve an overlap in the focused laser spot of 0-100% while the laser is activated to form the crack free, uniform and continuous bond. This setup also allows patterned bonding by selectively directing the laser on select portions of the bulk material to be bonded. During bonding, the electromagnetic radiation is directed through the insulator substrate (the sapphire in this example) to the interface with an appropriate duration and intensity to stimulate localized atomic mobility sufficient to produce chemical bonding between the bulk materials at the interface, but insufficient to alter the bulk materials in a way that degrades their mechanical properties or chemical resistance. In particular, the short duration of the pulses limits the magnitude of the interfacial stress field that naturally arises due to thermal expansion mismatch and thermal shock. Since resultant flaw sizes scale with the size of the localized stress field, typical interfacial flaws generated during bonding will only be small, typically on the order of nanometers. Thus, flaws of sufficient dimension are not generated that would elevate the local stress intensity to meet the propagation threshold.

Figure 8:
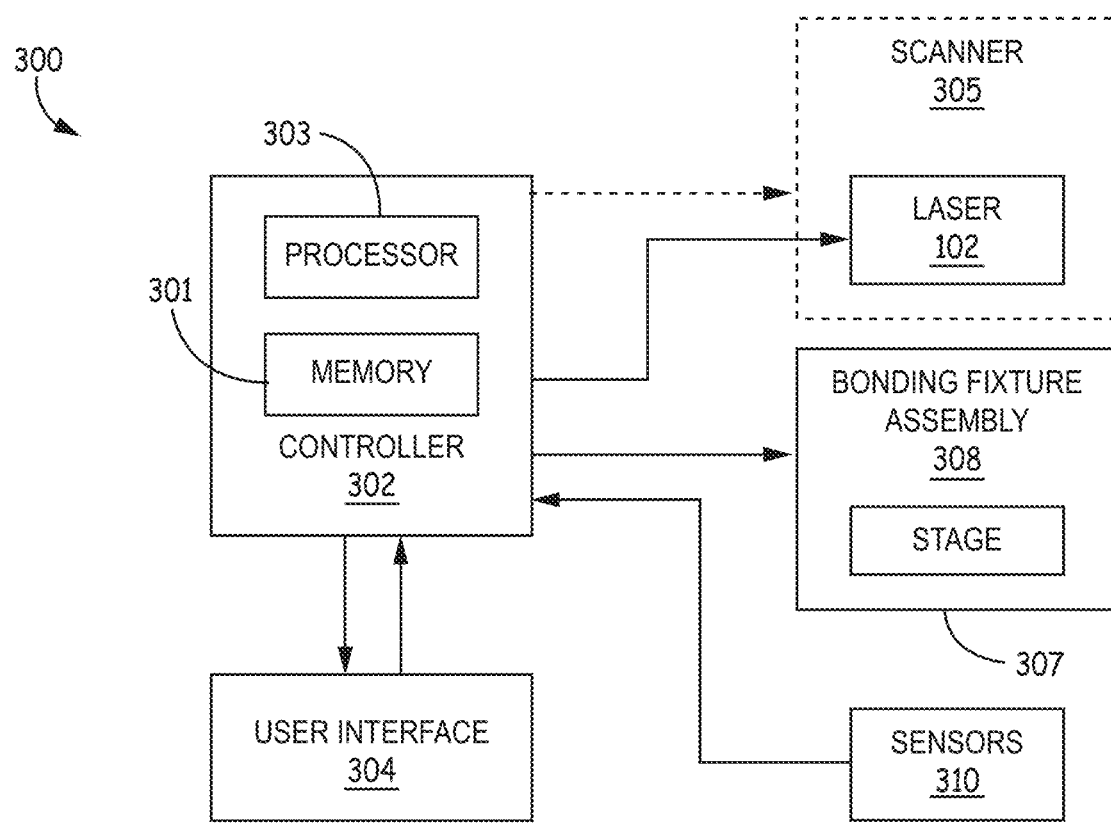
FIG. 8 is a block diagram of a rapid-temperature bulk material bond system of one embodiment of the present invention.

A block diagram of a rapid room-temperature bulk material bond system 300 is illustrated in FIG. 8. The system 300 includes the controller 302. The controller 302 includes a memory 301 for storage of instructions and processor 303 to process the instructions. A user interface 304 is in communication with the controller 302. A user provides instructions to the controller 302 such as setting the repetition rate, average laser power and stage movement and/or scanner rate through the user interface 304. Also illustrated in FIG. 7 is a bonding fixture assembly 308. The bonding fixture assembly 308 is used to hold and position the bulk material in relation to the laser 102. The fixture 308 in this embodiment includes a stage 307 upon which the bulk material is mounted. The stage 307 is designed to move in the X, Y and Z directions under the control of the controller 302. As discussed above, in one embodiment a scanner 305 under control of the controller 302 is implemented to move the laser 102 in relation to bulk material to be bonded that is being held by the fixture 308. The system 300 may also include one or more sensors 310 that provide information to the controller. For example, the sensors 310 may include position sensors, power meters, cameras, etc.

Figure 9A:
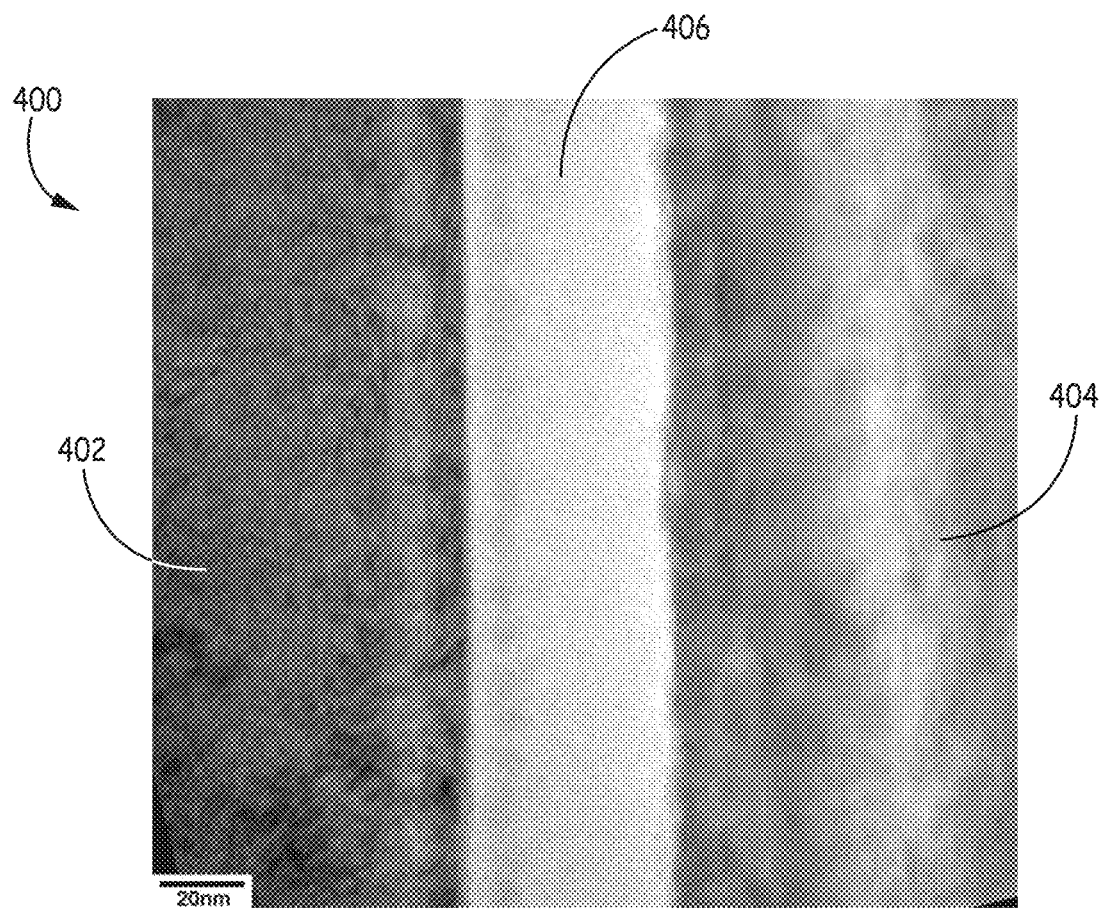
FIG. 9A is a nano-scale transmission electron microscope (TEM) image of a diffusion zone of a bond in titanium-sapphire bulk materials of an embodiment of the present invention.
Figure 9B:
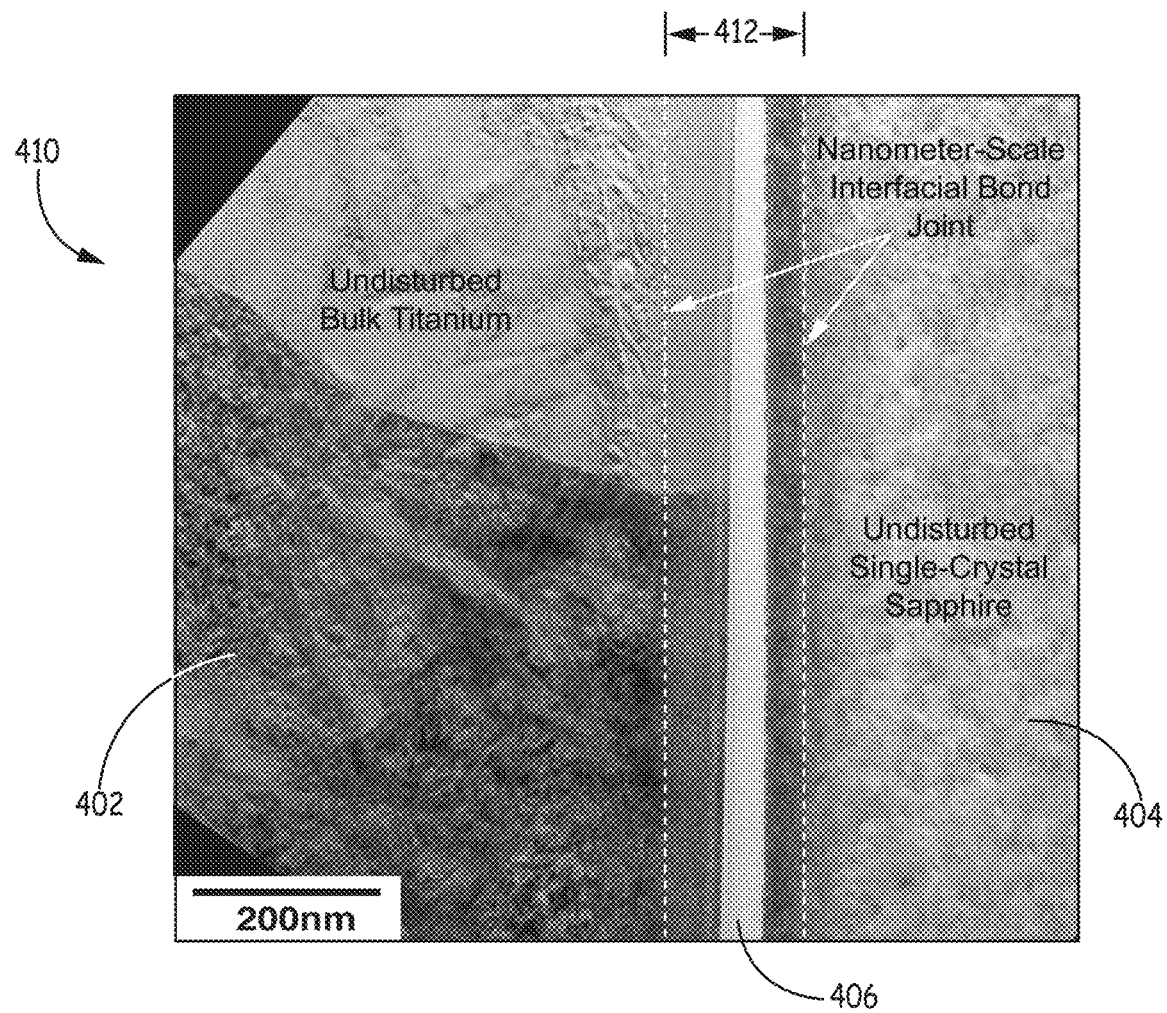
FIG. 9B is a nano-scale TEM image of an interfacial bond joint of in the titanium-sapphire bulk materials of an embodiment of the present invention.
Figure 9C:
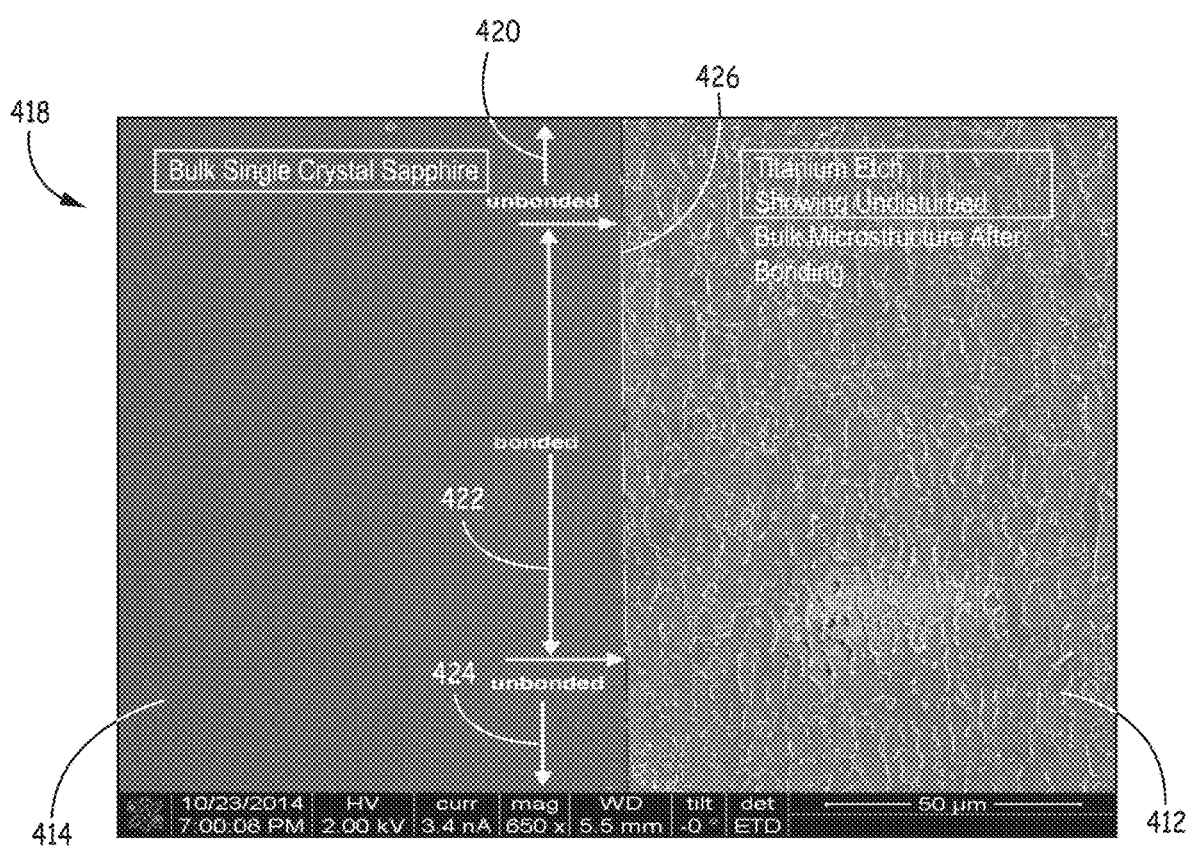
FIG. 9C is a micro-scale scanning electron microscope (SEM) image of the bonded titanium-sapphire bulk materials of an embodiment of the present invention.

FIG. 9A illustrates a transmission electron microscope (TEM) image of a diffusion zone 406 of bonded titanium 402 and sapphire 404 as formed by the steps set out above. As a result of the energy of the electromagnetic beam, as described above, interacting with the titanium, the titanium is diffused into the alumina (sapphire) to form a diffusion zone 406. As illustrated, the diffusion zone 406 in this example is uniform and is less than 60 nm thick. Moreover, the titanium 402 drops off monotonically across the interface and approaches zero as the diffusion zone 406 approaches the sapphire 404. This structure is not what would be expected for a typical high temperature, long duration diffusion bond. For example, the slope of the concentration gradient resulting from the laser bonding process is different than what would be produced in typical diffusion bonding. Also, it is nearly impossible to diffusion bond titanium to sapphire directly with techniques known in the art without adding an interlayer of glass and/or metal (for example niobium) to manage the stress and/or undesirable phases. In the titanium-sapphire example, the bonded interface region contains titanium, aluminum and oxygen which are good transitions to the bulk materials. As mentioned above, the techniques described above result in a bond that is as strong as at least one of the bulk materials used. In the titanium-sapphire example, the bond is as strong as the sapphire. Referring to FIG. 9B, a TEM image 410 also in the nanometer (nm) range is provided. This image illustrates that a nano-scale interfacial bond joint 412 is formed that is less than 200 nm thick. Beyond the less than 200 nm interfacial bond joint, the titanium 402 and sapphire 404 are undisturbed. That is, the formation of the bond, as described above, does not change the properties of the titanium 402 and sapphire 404 beyond the nanometer scale interfacial bond joint 412 which is less than 200 nm in this example. As TEM image 410 of FIG. 9B illustrates, the bond includes the interfacial bond joint 412 in which the diffusion zone 406 is created. Referring to FIG. 9C, a scanning electron microscope (SEM) image 418 in the micrometer (µm) scale is provided. Here again the image illustrates that the bulk sapphire 404 and the bulk titanium 402 is undisturbed by the formation of the bond 422 except for the nanometer scale interfacial bond joint 412 area near the bulk material surfaces that are bonded together as described above. FIG. 9C also illustrates the bulk materials can be pattern bonded. In particular, FIG. 9C illustrates unbonded areas 420 and 424 and bonded area 422. Hence, because the techniques described above allow for precise location control over the electromagnetic beam forming bonds, a pattern of spaced bonded areas can be formed between the contacted surface areas of the bulk materials if desired. The above, describes and illustrates a diffusion zone of less than 60 nm in a titanium-sapphire bond. However, diffusion zones in the range of 10 nm to 1000 nm are anticipated in embodiments by varying the parameters and material to be bonded.

Figure 10:
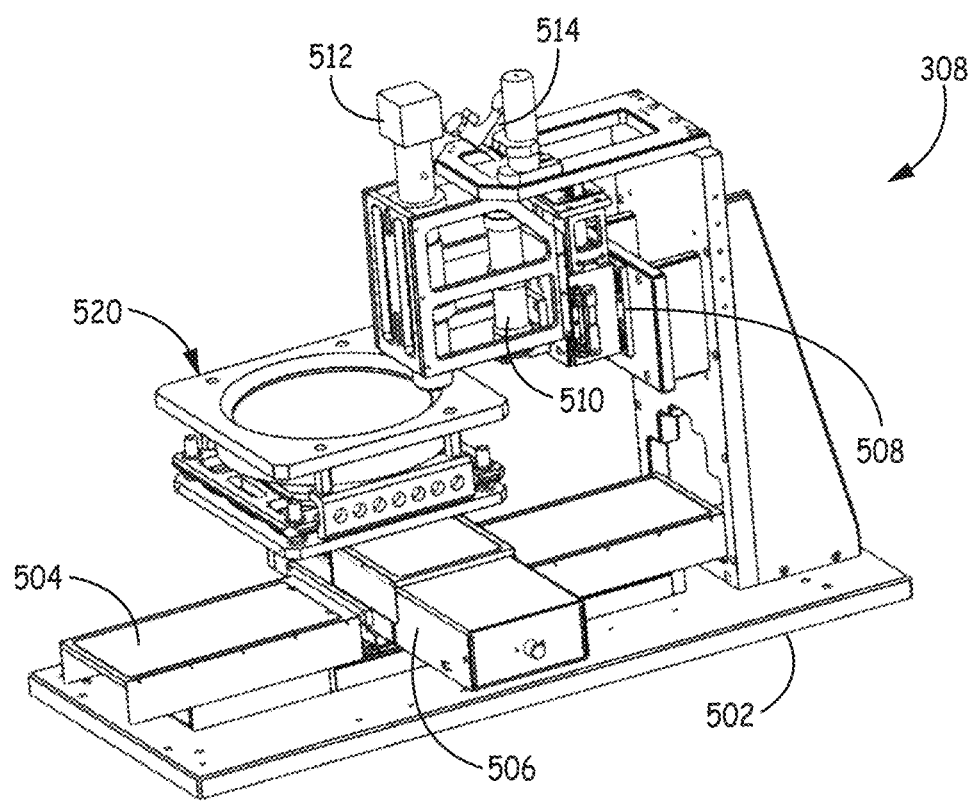
FIG. 10 is a side perspective view of a bonding fixture assembly of one embodiment of the present invention.
Figure 11:
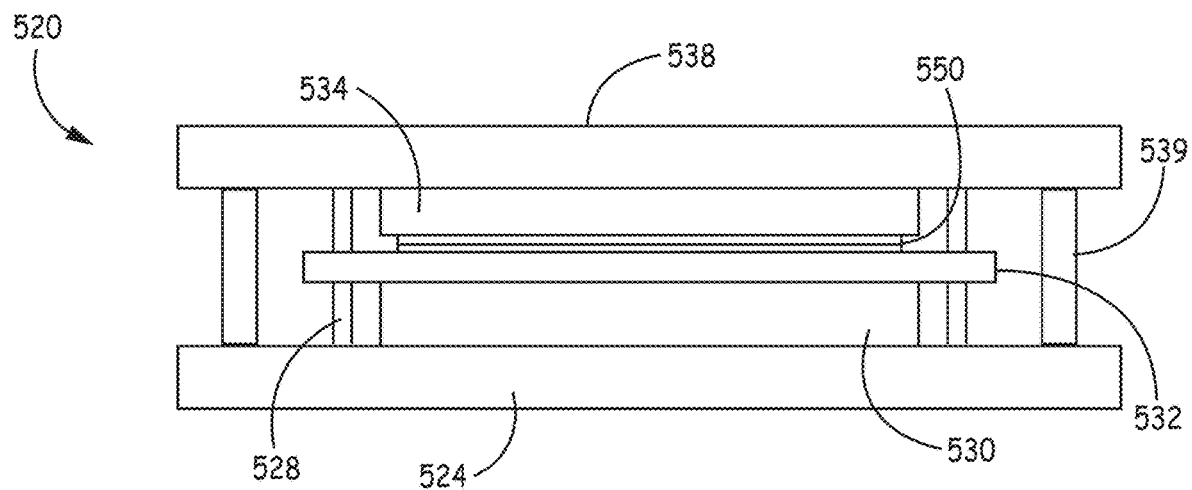
FIG. 11 is an side view of a material holding assembly of one embodiment of the present invention.

FIG. 10 illustrates an example of a bonding fixture assembly 308 that is used in an embodiment. The bonded fixture assembly 308 is used to hold and position the bulk materials as well as direct the laser onto the bulk materials. This example bonding fixture assembly 308 includes a base 502 upon which are mounted an X-axis motion stage 504, a Y-axis motion stage 506 and a Z-axis motion stage 508. The X-axis motion stage 504, Y-axis motion stage 506 and Z-axis motion stage 508 make up stage 307 discussed above. They position the bulk materials under the control of the controller 302. The bonding fixture assembly 308 is also illustrated as including a focus optic assembly 510, a camera assembly 512 and alignment optics 514 used in the bonding process. An example of a similar fixture is found in U.S. patent application Ser. No. 13/291,956 entitled "Room Temperature Glass-To-Glass, Glass-to-Plastic and Glass-To-Ceramic/Semiconductor Bonding" which is herein incorporated in its entirety by reference. The bonding fixture assembly 308 further includes a material holding assembly 520 which is further described in detail in view of FIGS. 11 and 12.

Figure 12:
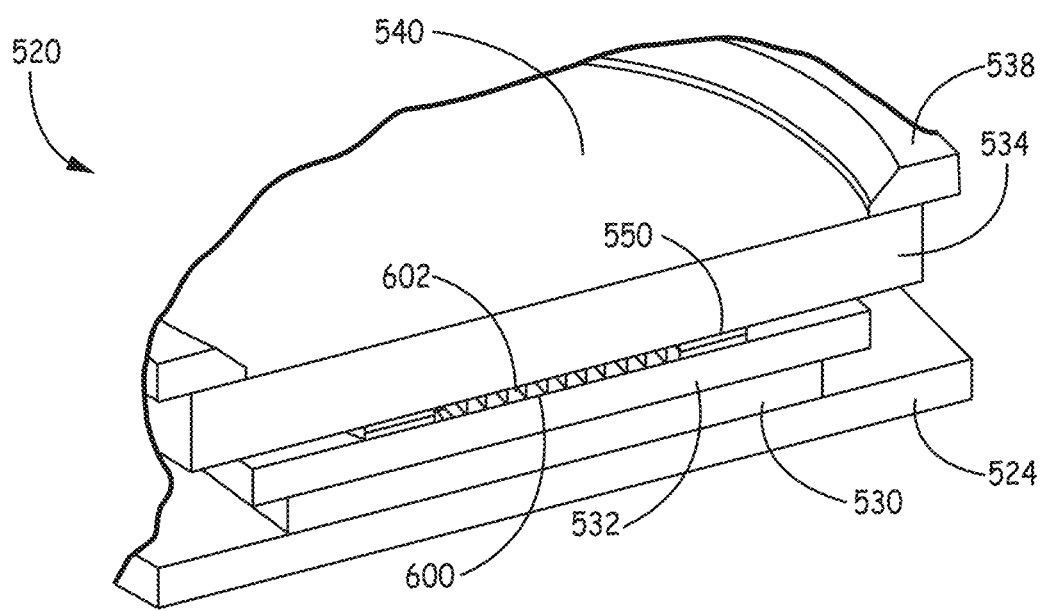
FIG. 12 is a partial cross-sectional side perspective view of a material holding assembly of one embodiment of the present invention.

The material holding assembly 520 includes an engagement support 524 and a securing plate 538. Coupled between the engagement support 524 and securing plate 538 is a set of four spacing rods 539 and four translation rods 528. Further between engagement support 524 and the securing plate 538 is positioned an expansion assembly 530. The expansion assembly 530 includes at least one pneumatic expansion device that is under control of the controller 302. A slide plate 532 is positioned over the expansion assembly 530. The slide plate 532 includes spaced slots that receive the respective translation rods 528. In use, the expansion assembly 530 selectively moves the slide plate 532 along the translation rods 528. A holding frame 550 that holds the bulk materials to be bonded is positioned above the slide plate 532. An optical flat 534 is in turn positioned over the holding frame 550. The optical flat 534 is made from a material that is transparent to the laser. As discussed above, the securing plate 538 is coupled via spacers 539 to the engagement support 524 in such a manner that the optical flat 534, the holding frame 550, the slide plate 532 and the expansion assembly 530 are sandwiched between the engagement support 524 and the securing plate 538. The securing plate 538 includes a central passage 540 (as illustrated in FIG. 12) for an electromagnetic beam to pass through. The central passage 540 of the securing plate 538 has a diameter that is smaller than a diameter of the optical flat 534. In use, once the material to be bonded is placed in the holding frame 550 and the holding frame 550 is positioned within the material holding assembly 520, the controller 302 (shown in FIG. 8) selectively activates the expansion assembly 530 to move the slide plate 532 along the translation rods 528. This action asserts a pressure on the holding fixture 550 which in turn asserts a pressure on the bulk materials to be bonded since the holding flat 534 is held in place via the securing plate 538. In another embodiment, a number of separate titanium components may be bonded to a single sapphire substrate, each titanium component being appropriately presented and aligned. Likewise, a number of separate sapphire substrates or components may be bonded to a single titanium part.

In FIG. 12, a partial cross-sectional view of the material holding assembly 520 with the bulk materials 600 and 602 held in the holding frame 550 is illustrated. In this example, the bulk materials include the titanium 600 and a layer of sapphire 602. The thickness of titanium would generally be more than 10 µm and typically within the range of 10 µm to 100 mm. The thickness of the sapphire used would be in the 50 µm to 50 mm range, although other thicknesses could be used. As FIG. 12 illustrates, the bulk materials 600 and 602 are sandwiched between the optical flat 534 and the holder frame 550. In use, the electromagnetic beam is transmitted through the central passage 540 of the securing plate and through the optical flat 534 and sapphire layer 602 to the titanium 600 while the sapphire and titanium are being pushed together via the material holding assembly 520 so the surfaces to be bonded are in contact with each other. The interaction of the electromagnetic beam on the titanium, as discussed above, causes the titanium to diffuse into the sapphire to create the interfacial bond joint 412 with an amorphous diffusion zone 406 which bonds the sapphire to the titanium. FIG. 12 also illustrates that the titanium 600 is patterned in an embodiment. In this embodiment, the titanium is structured as desired for the product design. Interconnecting webs of the titanium bulk material 600 provide a desired lateral stability and vertical compliance. The configuration of the titanium bulk material (wafer) makes it compliant such that each formed portion of the titanium wafer can come up to the sapphire while still being held contiguous yet being individually flexible. This provides intimate surface to surface contact between the titanium and sapphire in the areas to be bonded by helping to compensate for moderate non-flatness of the surfaces of the titanium and sapphire. Any moderate relatively large area of non-flatness across a whole surface can be mitigated by having the flexible structured titanium wafer pressed against the sapphire so it bends/compresses ever so slightly to insure that the locally flat areas to be bonded are placed in intimate contact.

Figure 13:
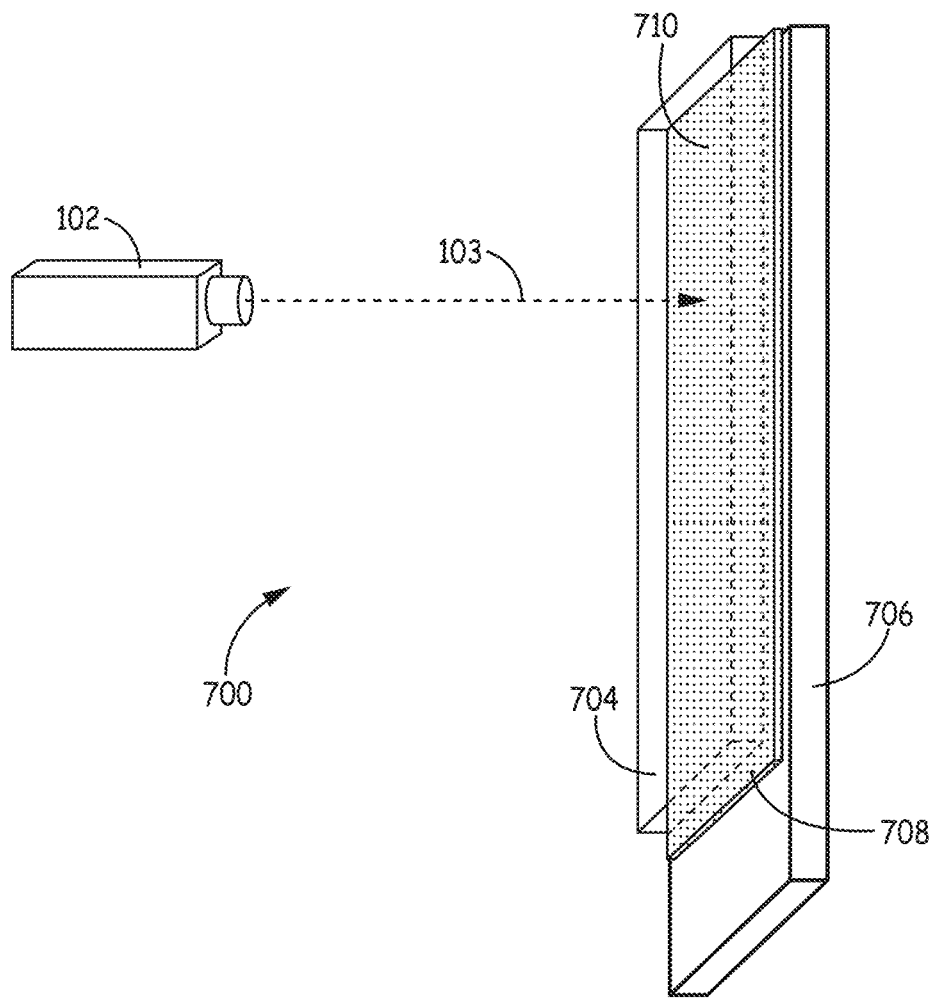
FIG. 13 is a pictorial illustration of the formation of a bond in another embodiment of the present invention.

In another embodiment, a thin interlayer 708 is positioned between the bulk materials 704 and 706 to be bonded. This is illustrated in FIG. 13. In an embodiment, the interlayer 708 is deposited on the transparent material 704 or the absorbent opaque material 706 (or both) prior to bonding. Examples of the thin interlayer 708 include thin metal films such as, but not limited to, titanium, niobium, tantalum, aluminum, zirconium, chromium, silicon nitride ($Si_3N_4$) etc. Thin conductive interlayers may facilitate an electrical connection of the absorbent opaque material (such as titanium) to other devices structures and/or electrical components. The thin interlayer 708 may also reduce the surface finish requirements and provide a more consistent surface to absorb the laser energy. The thickness of the thin interlayer 708 is in the nm to a few µm range. As with the embodiments discussed above, the laser 102 provides a laser signal 103 that travels through the transparent material 704 until it reaches the thin interlayer 708 and the absorbent opaque material 706. In response to the energy of the laser signal 103, the thin interlayer 708 bonds to both the transparent material 704 and the absorbent opaque material 706 to form a bond between the transparent material 704 and the absorbent opaque material 706. In the case of thicker (um range) interlayers 708 applied to the absorbent opaque material 706, the formed bond may be only between the interlayer and the transparent material 704. Moreover, with one embodiment, the interlayer 708 includes an antireflective (AR) coating. This embodiment helps enhance bonding at lower energies without creating cracks. Moreover, in one embodiment, an AR coating is used for back reflected beams and better absorption with lower power. Moreover, in one embodiment a soft sputtered interlayer is used. In this embodiment, a micrometer ductile deposition 708 is deposited on a surface of the opaque material 706. The soft sputtered interlayer 708 absorbs interfacial motion of the bonded materials. This increases the interfacial strain the bond joint can handle before fracturing or cracking due to external loads or local loads such as may result from temperature changes of bulk materials having different thermal expansion coefficients. Further examples of the use of thin films for bonding are found in U.S. patent application Ser. No. 12/977,890, filed on Dec. 23, 2010, entitled "Techniques for Bonding Substrates Using an Intermediate Layer," which is herein incorporated by reference. Embodiments of bonding as described above can be used to seal cavities. An advantage of forming cavities with the bonding processes as described above is that the composition of an internal atmosphere in the cavities can be controlled during the forming process.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. Bulk materials having a kinetically limited nano-scale diffusion bond comprising:
    transparent material having properties that allow an electromagnetic beam of a select wavelength to pass there through without more than minimal energy absorption;
    absorbent opaque material having properties that significantly absorb energy from the electromagnetic beam; and
    a diffusion bond formed by the electromagnetic beam bonding the transparent material to the absorbent opaque material, the diffusion bond having a thickness less than 1000 nm, the diffusion bond including an interfacial bond joint region that is less than 200 nm and an amorphous diffusion zone that is less than 60 nm thick and within the interfacial bond joint region; and
    an undisturbed transparent material and an undisturbed absorbent opaque material, each of the undisturbed transparent material and the undisturbed absorbent opaque material proximately located on opposing sides of the diffusion bond and outside the interfacial bond joint, wherein mechanical properties or chemical resistance of each of the undisturbed transparent material and the undisturbed absorbent opaque material not being degraded by the formation of the diffusion bond.

2. The bulk materials having a kinetically limited nano-scale diffusion bond of claim 1, wherein the diffusion bond comprises the absorbent opaque material having diffused into the transparent material to create the interfacial bond joint with the amorphous diffusion zone that bonds the transparent material and the absorbent opaque material.

3. The bulk materials having a kinetically limited nano-scale diffusion bond of claim 1, wherein the bond forms a hermetic seal.

4. The bulk materials having a kinetically limited nano-scale diffusion bond of claim 1, wherein the bond is at least one of corrosion-resistant, crack free, uniform and bio-stable.

5. The bulk materials having a kinetically limited nano-scale diffusion bond of claim 1, wherein the bond strength is as strong as at least one of the transparent material and the absorbent opaque material.

6. The bulk materials having a kinetically limited nano-scale diffusion bond of claim 1, wherein the absorbent opaque material is compliant.

7. The bulk materials having a kinetically limited nano-scale diffusion bond of claim 1, further comprising:
    at least one interlayer used to form the bond.

8. The bulk materials having a kinetically limited nano-scale diffusion bond of claim 7, wherein the at least one interlayer is at least one of an antireflective coating interlayer and a soft sputtered interlayer.

9. The bulk materials having a kinetically limited nano-scale diffusion bond of claim 1, wherein the transparent material is sapphire and the absorbent opaque material is titanium.

10. Bulk materials having a kinetically limited nano-scale diffusion bond comprising:
    transparent material having properties that allow an electromagnetic beam of a select wavelength to pass there through without more than minimal energy absorption;
    absorbent material having properties that significantly absorb energy from the electromagnetic beam;
    a bond formed by the electromagnetic beam bonding the transparent material to the absorbent material, the bond having an interfacial bond joint that is less than 1000 nm in thickness, the bond including an interfacial bond joint region that is less than 200 nm and an amorphous diffusion zone that is less than 60 nm thick and within the interfacial bond joint region; and
    an undisturbed transparent material and an undisturbed absorbent opaque material, each of the undisturbed transparent material and the undisturbed absorbent opaque material proximately located on opposing sides of the diffusion bond and outside the interfacial bond joint, wherein mechanical properties or chemical resistance of each of the undisturbed transparent material and the undisturbed absorbent opaque material not being degraded by the formation of the diffusion bond.

11. The bulk materials having a kinetically limited nano-scale diffusion bond of claim 10, wherein the bond forms a hermetic seal.

12. The bulk materials having a kinetically limited nano-scale diffusion bond of claim 10, wherein the bond is at least one of corrosion-resistant, uniform and bio-stable.

13. The bulk materials having a kinetically limited nano-scale diffusion bond of claim 10, wherein the bond strength is as strong as at least one of the transparent material and the absorbent material.

14. The bulk materials having a kinetically limited nano-scale diffusion bond of claim 10, wherein the absorbent material is compliant.

15. The bulk materials having a kinetically limited nano-scale diffusion bond of claim 10, further comprising:
at least one interlayer used to form the bond.

16. The bulk materials having a kinetically limited nano-scale diffusion bond of claim 10, wherein the transparent material is sapphire and the absorbent material is titanium.

17. The bulk materials having kinetically limited nano-scale diffusion bond of claim 10, wherein the bond formed by the electromagnetic beam bonding the transparent material to the absorbent material further comprises:
a plurality of spaced bond areas.

18. A method of forming a kinetically limited nano-scale diffusion bond in bulk materials, the method comprising:
positioning a first surface to be bonded of a transparent material against a second surface to be bonded of an absorbent opaque material, the transparent material having properties that allow an electromagnetic beam of a select wavelength to pass there through without more than minimal energy absorption and the absorbent opaque material having properties that significantly absorbs energy from the electromagnetic beam;
applying pressure to the transparent material and absorbent opaque material;
selectively passing the electromagnetic beam through the transparent material to the second surface to be bonded of the absorbent opaque material; and
creating the kinetically limited nano-scale diffusion bond with the electromagnetic beam by stimulating localized atomic mobility sufficient to create an interfacial bond joint less than 1000 nm and sufficient to create an interfacial bond joint less than 200 nm that includes an interfacial bond joint with a diffusion zone less than 60 nm thick.

19. The method of claim 18, further comprising:
processing the first surface to be bonded of a transparent material and the second surface to be bonded of an absorbent opaque material to prepare the first surface and the second surface for bonding.

20. The method claim 18, further comprising:
introducing at least one interlayer between the first surface of the transparent material and the second surface of the absorbent opaque material prior to applying pressure.

21. The method of claim 18, further comprising:
setting parameters of the electromagnetic beam.

22. The method of claim 21, wherein setting the parameters of the electromagnetic beam further comprises:
setting an energy pulse in the range of 0.1 to 5 µJ;
setting a spot size in a range of 1 to 200 µm; and
setting a pulse overlap in a range of 0 to 100%.

23. The method of claim 18, further comprising:
moving one of the electromagnetic beam and the transparent and absorbent opaque materials in relation to each other at a rate that sets the pulse overlap.

24. The method of claim 23, wherein the one of the electromagnetic beam and the transparent and absorbent opaque materials is moved in relation to each other at a rate in the range of 0.1 mm/s to 300 m/s.

25. The method of claim 18, wherein applying pressure to the transparent material and absorbent opaque material further comprises:
applying enough pressure to at least achieve high point contact of the first surface of the transparent material and the second surface of the absorbent material.

26. The method of claim 18, further comprising:
selecting an electromagnetic beam having a wavelength that allows the electromagnetic beam to pass through the transparent material without more than minimal energy absorption by the transparent material while the absorbent opaque material significantly absorbs energy from the electromagnetic beam.

27. The method of claim 18, wherein creating the kinetically limited nano scale diffusion bond further comprises:
creating a bond that is at least one of hermetically sealed, corrosion-resistant, crack free, uniform and bio-stable.

28. The method of claim 18, wherein the transparent material is sapphire and the absorbent opaque material is titanium.

29. The method of claim 18, wherein the electromagnetic beam consists of one of a pulsed wave and a continuous wave.

30. The method of claim 18, wherein creating the kinetically limited nano-scale diffusion bond with the electromagnetic beam further comprises:
creating a pattern of spaced bond areas in the bulk materials.

* * * * *